UNITED STATES PATENT OFFICE.

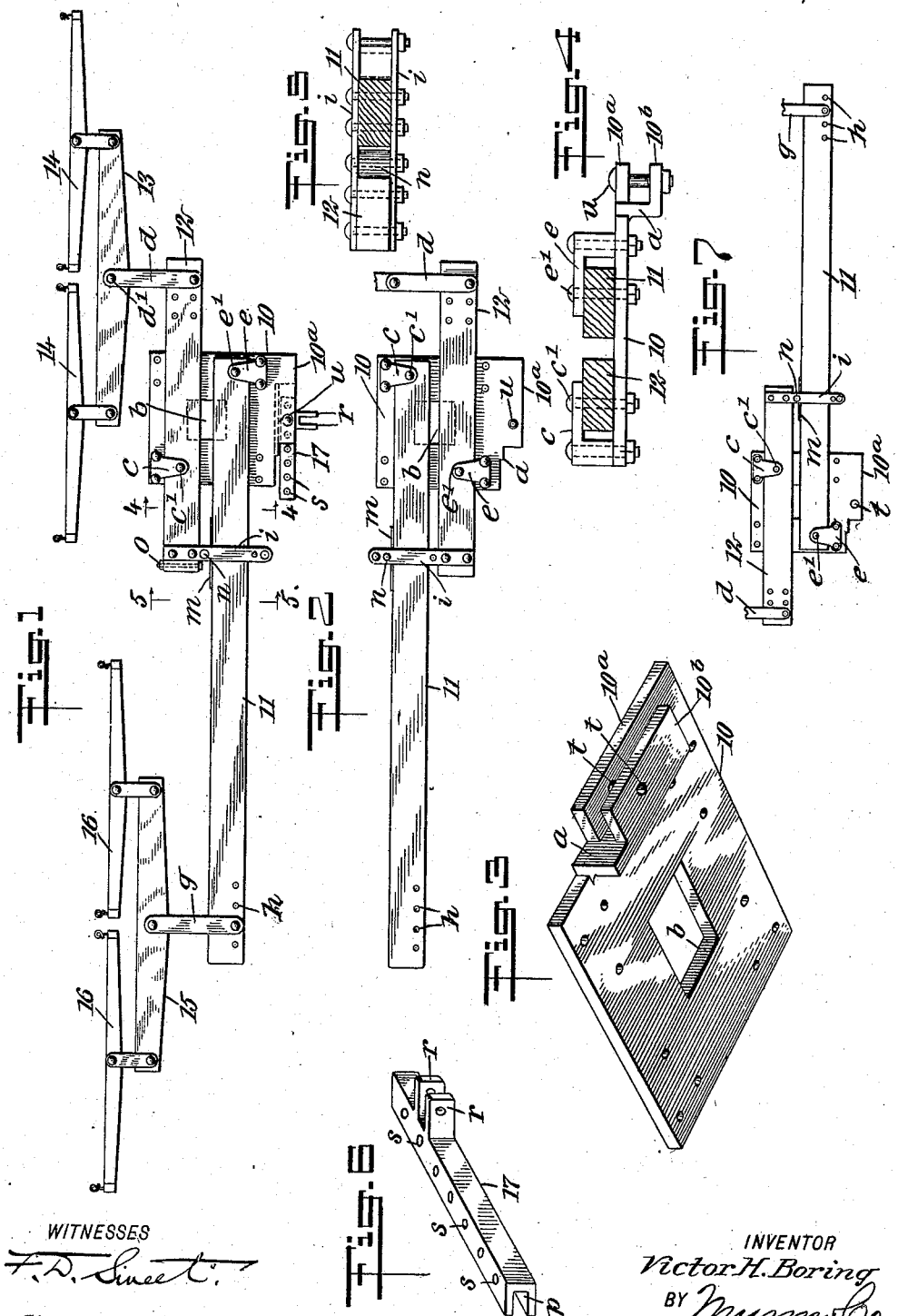

VICTOR H. BORING, OF SUMNER, MISSOURI.

DRAFT-EQUALIZER.

No. 923,619.  Specification of Letters Patent.  Patented June 1, 1909.

Application filed November 11, 1908. Serial No. 462,031.

To all whom it may concern:

Be it known that I, VICTOR H. BORING, a citizen of the United States, and a resident of Sumner, in the county of Charlton and State of Missouri, have invented a new and Improved Draft-Equalizer, of which the following is a full, clear, and exact description.

The purpose of this invention is to provide novel details of construction of a draft equalizer, for four draft animals hitched in pairs at each side of the line of draft respectively, which will enable the even distribution of draft strain upon each pair of animals, or impose proportionately less load strain upon a weaker team than the other pair has to pull. And a further object is to provide a draft equalizer which may be readily changed in adjustment, so that the increased leverage may be disposed at the left or right side of the equalizer as may be desired.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of the improved draft equalizer, showing parts arranged for increased leverage at the left side of the device; Fig. 2 is a plan view of some details shown in Fig. 1, but changed in arrangement; Fig. 3 is an enlarged inverted perspective view of a coupling plate that is a novel detail; Fig. 4 is an enlarged transverse sectional view, substantially on the line 4—4 in Fig. 1; Fig. 5 is a transverse sectional view, substantially on the line 5—5 in Fig. 1; Fig. 6 is a perspective view of an adjustable draft bar that is a novel detail of the invention; and Fig. 7 is a plan view of details similar to those shown in Fig. 2, but changed in relative positions.

The coupling plate 10 that is an important feature of the improvement, is formed of metal and is preferably cast from iron. The periphery of the plate 10 is mainly rectangular, with the exception that two spaced and parallel flanges $10^a$, $10^b$, are formed along one side edge of said plate, as shown in Figs. 3 and 4. The flange $10^b$, which is lowermost in service, is shorter than the opposite flange $10^a$; the latter extending from the right side edge of the plate, is level on the upper surface with a like surface of the coupling plate, and said flanges are spaced apart by a bottom web formation $a$, as shown in Fig. 4. The coupling plate 10 is lightened by removing material at its center, as shown at $b$, and perforations are formed therein near each corner, which will be more fully described in their order.

Two evener bars 11, 12, are provided that are loosely secured upon the upper surface of the coupling plate 10. The bars 11, 12, are formed of wrought metal, each having a flat body of a suitable thickness and parallel side edges, the bar 11 being of considerably greater length than the bar 12. A clamp $c$ is removably secured upon the coupling plate 10 near a forward corner thereof, as shown in Fig. 1; said clamp is near the left upper corner of the plate. The evener bar 12 that in Fig. 1 is placed upon the coupling plate 10 near the front edge thereof, is pivoted thereon through the horizontal member of the clamp $c$ that laps upon the bar, by a removable bolt $c'$. The evener bar 12, as shown in Fig. 1, projects nearly an equal distance from each side edge of the coupling plate 10, but as shown in Fig. 1, the pivot bolt $c'$ is located near the left side edge of said plate, it will be seen that the portion of the evener bar extending to the right from said pivot is about twice as long as the portion that extends to the left, thus affording leverage for the longer portion in proportion to the difference in their lengths.

Upon the portion of the evener bar 12 that extends to the right from the coupling plate 10, a pair of link plates $d$ are oppositely lapped and pivoted at their rear ends, by a bolt that passes through perforations in the link plates and also through one of a plurality of perforations formed at intervals in the evener bar 12. The link plates $d$ at their forward ends, loosely embrace a doubletree 13 and are pivoted thereto by a bolt $d'$ that passes through said doubletree at its center of length. A pair of swingletrees 14 are respectively clipped upon the ends of the doubletree, and afford means for connecting a pair of draft animals to the evener bar 12.

The evener bar 11 is proportioned in length to afford the desired leverage for a pair of draft animals that are to pull along with a pair of horses hitched to the swingletrees 14, and as shown, consists of a flat bar of metal that may be similar in width and thickness to the evener bar 12. The evener bar 11, if arranged as shown in Fig. 1, is lapped at one end across the upper surface of the coupling plate 10, and disposed thereon parallel with and rearward of the evener bar 12.

A clamp e, similar to the clamp c is removably secured upon the coupling plate 10 near the right side edge thereof, and the horizontal member of said clamp is lapped upon the end portion of the evener bar 11 that is pivoted upon the coupling plate by a bolt e' that passes through the clamp e and coupling plate, and is held in place by a nut or other means.

Upon the left end of the evener bar 11, link plates g are pivoted in a selected perforation h of a spaced row of the same, and at their forward ends embrace a doubletree 15 similar to the doubletree 13 and whereon swingletrees 16 are clipped for service. Upon the left end of the evener bar 12 two flat guide plates i are oppositely secured and thence project rearward as shown in Fig. 1.

Upon the forward edge of the evener bar 11, a wear plate m is attached, and between the adjacent side edges of the evener bars 11, 12, a roller n is loosely mounted on a pivot bolt that is secured at its ends in the guide plates i, said roller having contact with the wear plate m.

To prevent splitting, the left end of the evener bar 12 is reinforced by the insertion of a transverse clamping bolt o therethrough, and screwing a nut on one end of said bolt as is shown in Fig. 1.

Between the flanges $10^a$, $10^b$ on the coupling plate 10, a draft bar 17 is loosely fitted; said bar that is an important detail of the invention is constructed as is clearly shown in Fig. 6. The body of the draft bar is of a suitable length, has parallel upper and lower sides, and is preferably channeled in one side that has contact with the bottom web a when the draft bar is in position for service. Upon the opposite side from that having the channel p therein, two spaced jaws r are formed that are parallel with each other, and transversely perforated for the reception of a connecting bolt, not shown, employed for detachably securing the equalizer device upon a beam or frame of a sulky plow or other machine to be drawn by animals. A number of spaced perforations s are formed in the normally upper and lower walls of the draft bar 17 and are alined in pairs, and in the spaced flanges $10^a$, $10^b$, two opposite perforations t are formed. It will be noted that any selected pair of perforations s may be disposed in alinement with the perforations t, and a bolt u passed through the alined perforations s, t, thereby securing the draft bar in the space between the flanges $10^a$, $10^b$.

It will be seen that the draft bar 17, may be shifted endwise in the groove between the flanges $10^a$, $10^b$, and secured at a desired point, thus disposing the pair of coupling jaws r toward or beyond either side edge of the coupling plate and thus change the line of draft-strain correspondingly.

It will be apparent from the relative arrangement of the evener bars 11, 12, and the attachments to their ends, that a pair of strong, heavy horses connected to the swingletrees 14 will be caused to pull a proportionately greater load than a weaker pair of draft animals that are hitched to the swingletrees 16, due to the leverage afforded by the excess in length had by the evener bar 11. By changing the position of the draft bar 17 endwise, so as to either slide it or turn it bottom side up, the jaws r may be located to the right or the left of the center of the coupling plate 10 and thus change the line of draft accordingly. In Fig. 2, the positions of the evener bars 11, 12, are shown changed so as to dispose the longer bar 11 forward of the shorter bar 12, the clamping plates c and e being changed in positions; this arrangement of the parts that disposes the longer evener bar in the lead, gives the team at the left some advantage over the other team that may be the stronger one.

The equalizer device so far as described, is for an arrangement of the longer evener bar 11 projected at the left side of the coupling plate 10, but it is to be understood that the parts may be readily changed in the relative positions so as to locate the evener bar 11 extended from the right side of the coupling plate 10, as appears in Fig. 7. In this arrangement of the evener bars 11, 12, the clamps c and e are disposed the same as shown in Fig. 2, but respectively engage different evener bars that are pivoted between said clamps and the coupling plate, as indicated at c', e' in Fig. 7. In either arrangement of the draft equalizer, the function of the draft bar 17 is the same, and it may be coupled to a load to be drawn by a clevis or other suitable means, that will enable the attachment of the spaced jaws or flanges r thereto, and thus adapt draft force of four horses to be applied as hereinbefore explained.

Having thus described my invention, I claim as new and desire to secure by Letters Patent:

1. In a draft equalizer, the combination with a coupling plate having a substantially rectangular body portion provided with parallel flanges at its rear side edge, the said flanges being spaced apart by a web extending downward from the body portion of the plate, the upper flange being level with the upper surface of the body of the coupling plate and extending from the right side edge of said plate, and the lower flange being shorter than the upper flange, of a long evener bar, a short evener bar, the said bars being located on the upper surface of the body of the coupling plate near the front and rear thereof respectively, and projecting in opposite directions, clamps having vertical members secured upon the body portion of the coupling plate at diagonally opposite corners and horizontal members extending from the upper ends of the vertical members over the top of the respective evener bars, pivot bolts extending through the said clamps, bars and coupling plate, a draft bar held between the said flanges of the coupling plate for connecting the coupling plate with a load to be drawn, and draft appliances connected with the outer ends of the evener bars.

2. In a draft equalizer, the combination with a substantially rectangular coupling plate, of a long evener bar, a short evener bar, said bars being pivoted on the coupling plate near the front and rear edges thereof respectively, the long evener bar projecting from one side of the coupling plate and the short evener bar projecting approximately an equal distance from each side edge of the coupling plate, a projecting end portion of the shorter evener bar having opposite guide plates secured thereon, that loosely embrace the longer evener bar that is disposed parallel with the shorter evener bar, a wear plate on the front edge of the long evener bar, and a roller carried by the guide plates, the said roller having contact with said wear plate.

3. In a draft equalizer of the character described, the combination with the rectangular coupling plate, a long evener bar and a short evener bar, the said bars being located on the upper surface of the coupling plate one in front of the other, the long evener bar projecting from one side edge of the coupling plate and the short evener bar projecting approximately an equal distance from each side edge of the coupling plate, of means for securing the evener bars on the coupling plate, said means permitting a reversal in position endwise and laterally of the evener bars, so as to extend the longer bar either from the right or the left side edge of the coupling plate.

4. In a draft equalizer of the character described, the combination with the coupling plate, and means for connecting the coupling plate with a load to be drawn, of a long evener bar and a short evener bar, the said bars being located on the upper surface of the body of the coupling plate, one in front of the other and the long evener bar projecting from one side edge of the coupling plate and the short evener bar projecting approximately an equal distance from each side edge of the coupling plate, clamps carried by the coupling plate and extending over the evener bars, pivot bolts extending through the said clamps, bars and coupling plate, the pivot bolt for the long evener bar being at the end of said bar, and the pivot bolt for the short evener bar being located approximately one third the distance from the inner end of said bar, and draft appliances connected with the outer ends of the evener bars.

In testimony whereof I have signed my name to this specification in the presence of two subscribing witnesses.

VICTOR H. BORING.

Witnesses:
L. M. STEWART,
C. A. FELT.